(12) United States Patent
Tsai

(10) Patent No.: US 12,047,021 B2
(45) Date of Patent: Jul. 23, 2024

(54) MOTOR DRIVER HAVING HIGH SUCCESS RATE STARTING MECHANISM

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 234 days.

(21) Appl. No.: 17/878,151

(22) Filed: Aug. 1, 2022

(65) Prior Publication Data

US 2023/0387832 A1    Nov. 30, 2023

(30) Foreign Application Priority Data

May 25, 2022 (TW) ................... 111119410

(51) Int. Cl.
*H02P 1/00* (2006.01)
*H02P 1/16* (2006.01)

(52) U.S. Cl.
CPC ..................... *H02P 1/16* (2013.01)

(58) Field of Classification Search
CPC ............... H02P 1/16; H02P 6/20; H02P 1/04
See application file for complete search history.

(56) References Cited

U.S. PATENT DOCUMENTS

2024/0106359 A1\* 3/2024 Chen .................. H02P 6/186

\* cited by examiner

*Primary Examiner* — Karen Masih
(74) *Attorney, Agent, or Firm* — Li & Cai Intellectual Property (USA) Office

(57) ABSTRACT

A motor driver having a high success rate starting mechanism is provided. A multi-segment slope pattern circuit connects a plurality of values of waveforms of a starting waveform signal to form a curve. The multi-segment slope pattern circuit determines a plurality of slopes respectively of a plurality of curve segments included in the curve according to a plurality of parameters related to a motor. The multi-segment slope pattern circuit outputs a multi-segment slope pattern signal according to the plurality of slopes of the plurality of curve segments. A startup signal generating circuit outputs a first startup waveform signal according to the multi-segment slope pattern signal. A motor controller circuit controls a motor driving circuit to start up the motor according to the first startup waveform signal.

14 Claims, 8 Drawing Sheets

MOTOR DRIVER HAVING HIGH SUCCESS RATE STARTING MECHANISM

CROSS-REFERENCE TO RELATED PATENT APPLICATION

This application claims the benefit of priority to Taiwan Patent Application No. 111119410, filed on May 25, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver having a high success rate starting mechanism.

BACKGROUND OF THE DISCLOSURE

In electronic devices, fans are used to cool heat generating components such as processors. When the heat generating components are cooled down by the fans, data from circuits of the fans must be instantly obtained so as to precisely control rotational speeds of three-phase motors of the fans according to the obtained data, such that the fans can properly cool down the heat generating components with efficiency.

However, a conventional motor driver always outputs a same startup signal to start up the motor regardless of a target rotational speed of the motor. A curve formed of a plurality of peak values that are connected to each other has only one slope. Each time the conventional motor driver outputs the startup signal having the only one slope to start up the motor, an actual rotational speed of the motor cannot be directly increased to be equal to the target rotational speed of the motor. If the target rotational speed of the motor is a low rotational speed, the actual rotational speed of the motor is increased to be higher than the target rotational speed. Hence, a success ratio for starting the motor by the conventional motor driver is low. Even if the conventional motor driver successfully starts up the motor, the conventional motor driver cannot quickly increase the actual rotational speed of the motor to reach the target rotational speed, and excessively consumes energy in the process of starting up the motor and driving the motor to normally rotate.

SUMMARY OF THE DISCLOSURE

In response to the above-referenced technical inadequacies, the present disclosure provides a motor driver having a high success rate starting mechanism. The motor driver is applicable to start up a motor to rotate within a motor startup time interval. The motor driver includes a multi-segment slope pattern circuit, a startup signal generating circuit, a motor controlling circuit and a motor driving circuit. The multi-segment slope pattern circuit is configured to divide the motor startup time interval into a plurality of motor startup times according to a plurality of parameters related to the motor. The multi-segment slope pattern circuit is configured to connect a plurality of values respectively of a plurality of waveforms to each other to form a curve within the motor startup time interval. The multi-segment slope pattern circuit is configured to determine a plurality of slopes respectively of the plurality of curve including a plurality of curve segments to output a multi-segment slope pattern signal, according to the plurality of parameters related to the motor. The plurality of curve segments are used to start up the motor respectively within the plurality of motor startup times. The slope of the curve segment for starting the motor within each one of the plurality of motor startup times is different from that within any other one of the plurality of motor startup times. The startup signal generating circuit is connected to the multi-segment slope pattern circuit. The startup signal generating circuit is configured to output a first startup waveform signal according to the multi-segment slope pattern signal. The motor controlling circuit is connected to the startup signal generating circuit. The motor controlling circuit is configured to output a motor controlling signal according to the first startup waveform signal. The motor driving circuit is connected to the motor controlling circuit and the motor. The motor driving circuit is configured to output a motor starting signal to the motor to start up the motor according to the motor controlling signal.

In certain embodiments, the multi-segment slope pattern circuit divides the motor startup time interval into a first motor startup time and a second motor startup time that are included in the plurality of motor startup times.

In certain embodiments, the multi-segment slope pattern circuit divides the motor startup time interval into a first motor startup time, a second motor startup time, a third motor startup time and a fourth motor startup time that are included in the plurality of motor startup times.

In certain embodiments, the multi-segment slope pattern circuit connects a plurality of peak values respectively of the plurality of waveforms of the first startup waveform signal to each other to form the curve.

In certain embodiments, the multi-segment slope pattern circuit connects a plurality of valley values respectively of the plurality of waveforms of the first startup waveform signal to each other to form the curve.

In certain embodiments, the slope of the curve segment for starting up the motor within an earliest one of the plurality of motor startup times is smaller than the slope of the curve segment for starting up the motor within each later one of the plurality of motor startup times.

In certain embodiments, the multi-segment slope pattern circuit, according to the plurality of parameters related to the motor, determines a number of the plurality of motor startup times divided from the motor startup time interval and a time length of each of the plurality of motor startup times.

In certain embodiments, the plurality of parameters include a size of the motor, a weight of the motor, static friction that the motor being started up is subjected to, a target rotational speed of the motor, or any combination thereof.

In certain embodiments, the multi-segment slope pattern circuit stores a plurality of startup slope patterns. Each of the plurality of startup slope patterns includes a plurality of sub-slope pattern segments. The multi-segment slope pattern circuit selects one of the plurality of startup slope patterns according to the plurality of parameters related to the motor. The multi-segment slope pattern circuit determines that the plurality of slopes of the plurality of curve segments within the plurality of motor startup times are respectively equal to a plurality of slopes of the plurality of sub-slope pattern segments of the one of the plurality of startup slope patterns.

In certain embodiments, the motor driver further includes an initial waveform amplitude determining circuit. The initial waveform amplitude determining circuit is connected to the startup signal generating circuit. The initial waveform amplitude determining circuit is configured to, according to the plurality of parameters related to the motor, determine amplitudes of one or more of the plurality of waveforms of the first startup waveform signal for initially starting up the motor to output an initial waveform amplitude signal. The startup signal generating circuit outputs the first startup waveform signal, according to the initial waveform amplitude signal and the multi-segment slope pattern signal.

In certain embodiments, the plurality of parameters related to the motors include static friction that the motor being started up is subjected to, and the amplitudes of one or more of the plurality of waveforms of the first startup waveform signal is increased by the initial waveform amplitude determining circuit as the static friction that the motor being started up is subjected to increases.

In certain embodiments, the plurality of waveforms of the first startup waveform signal include a plurality of sinusoidal waveforms, a plurality of third harmonic waveforms, or a combination thereof.

In certain embodiments, the motor controlling circuit compares a plurality of values of the first startup waveform signal with a plurality of values of a second startup waveform signal to determine levels of the motor controlling signal so as to determine duty cycles of a plurality of waveforms of the motor controlling signal.

In certain embodiments, a plurality of waveforms of the second startup waveform signal include a plurality of triangle waveforms, a plurality of sawtooth waveforms, or a combination thereof.

As described above, the present disclosure provides the motor driver having a high success rate starting mechanism. The motor driver of the present disclosure is applicable to start up the motors that have different characteristics (such as different values of static friction that the motors of fans are respectively subjected) at a high success rate.

The motor driver of the present disclosure increases the amplitudes of the waveforms of the first startup waveform signal for starting up the motor to provide a higher driving force to the motor of the fan in a short period of time, such that the rotational speed of the motor is quickly increased to reach the target rotational speed required by a user.

The motor driver of the present disclosure connects the peak values of the waveforms of the first startup waveform signal to each other to form the curve having the plurality of slopes. The motor driver of the present disclosure determines one of the plurality of slopes according to the static friction that the motor of the fan being started up is subjected to. The motor driver of the present disclosure determines another of the plurality of slopes according to the target rotational speed of the motor. The motor driver of the present disclosure outputs the first startup waveform signal to start up the motor. As a result, the motor driver of the present disclosure provides the most suitable driving force to start up the motor for the characteristics of the motor such that the fan only generates low vibration noise.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
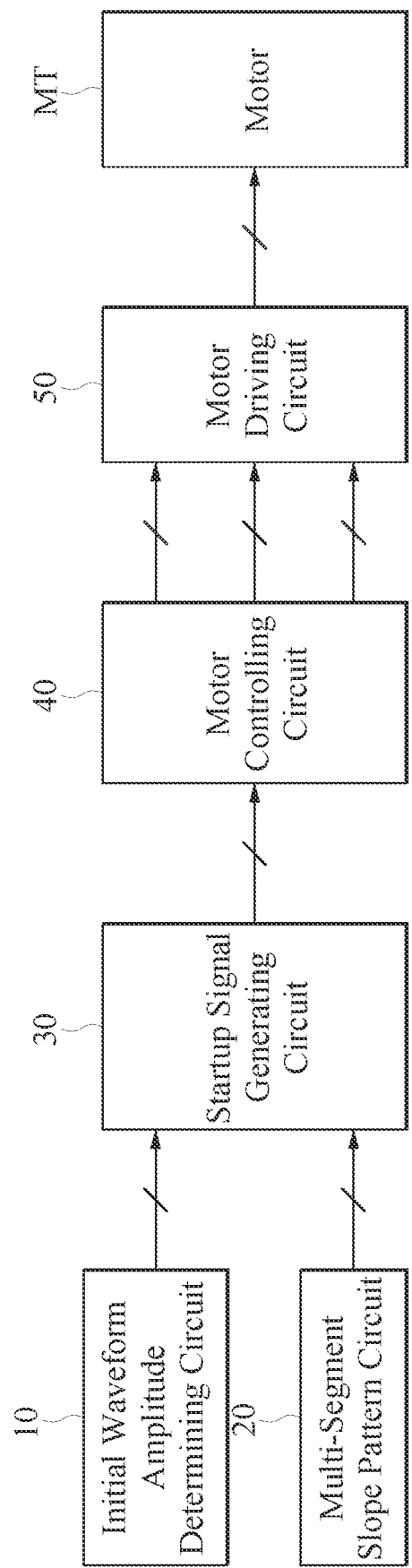
FIG. 1 is a block diagram of a motor driver having a high success rate starting mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
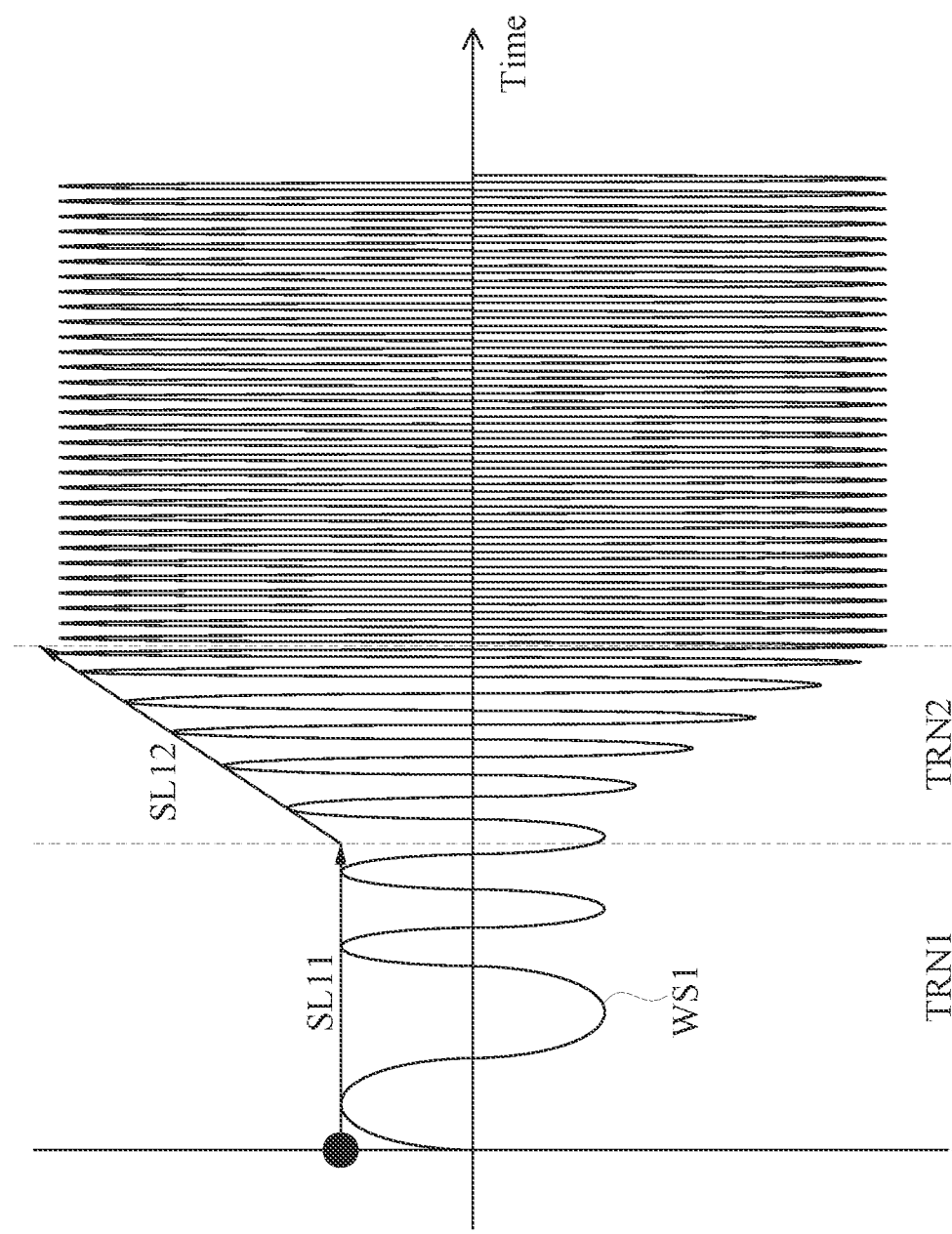
FIG. 2 is a waveform diagram of a signal of the motor driver having the high success rate starting mechanism according to the embodiment of the present disclosure.
Figure 3:
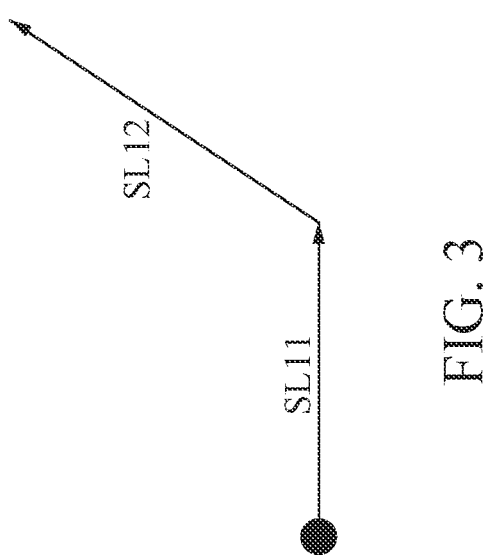
FIG. 3 is a schematic diagram of a plurality of slopes of a curve formed by connecting a plurality of peak values of waveforms of the signal of the motor driver having the high success rate starting mechanism according to the embodiment of the present disclosure.

Reference is made to FIGS. 1 to 3, in which FIG. 1 is a block diagram of a motor driver having a high success rate starting mechanism according to an embodiment of the present disclosure, FIG. 2 is a waveform diagram of a signal of the motor driver having the high success rate starting mechanism according to the embodiment of the present disclosure, and FIG. 3 is a schematic diagram of a plurality of slopes of a curve formed by connecting a plurality of peak values of waveforms of the signal of the motor driver having the high success rate starting mechanism according to the embodiment of the present disclosure.

The motor driver of the embodiment of the present disclosure may include a multi-segment slope pattern circuit 20, a startup signal generating circuit 30, a motor controlling circuit 40 and a motor driving circuit 50, which are applicable to start up a motor MT as shown in FIG. 1 to quickly increase an actual rotational speed of the motor MT to reach a target rotational speed.

As shown in FIG. 1, the multi-segment slope pattern circuit 20 may be connected to the startup signal generating circuit 30. The motor controlling circuit 40 may be connected to the startup signal generating circuit 30 and the motor driving circuit 50. The motor driving circuit 50 may be connected to the motor MT such as a three-phase motor.

Before the motor driver starts up the motor MT, the multi-segment slope pattern circuit 20 may divide a motor startup time interval into a plurality of motor startup times. The motor driver of the embodiment of the present disclosure may perform different driving operations on the motor MT respectively within the plurality of motor startup times.

First, the multi-segment slope pattern circuit 20 may, according to a plurality of parameters related to the motor MT, determine a number of the plurality of motor startup times divided from the motor startup time interval and a time length of each of the plurality of motor startup times. In the embodiment, the plurality of parameters related to the motor MT may include a size of the motor MT, a weight of the motor MT, static friction that the motor MT being started up is subjected, a target rotational speed of the motor MT and so on, but the present disclosure is not limited thereto.

For example, the multi-segment slope pattern circuit 20 divides the motor startup time interval into two motor startup times such as a first motor startup time TRN1 and a second motor startup time TRN2 as shown in FIG. 2, but the present disclosure is not limited thereto. The first motor startup time TRN1 is an earliest one of the motor startup times. The second motor startup time TRN2 is later than the first motor startup time TRN1.

The multi-segment slope pattern circuit 20 may connect a plurality of (voltages or currents) values of waveforms of a first startup waveform signal WS1 to each other to form a curve within the motor startup time interval (including the first motor startup time TRN1 and the second motor startup time TRN2). The curve includes a plurality of curve segments such as a first curve segment SL11 for starting up the motor MT within the first motor startup time TRN1 and a second curve segment SL12 for starting up the motor MT within the second motor startup time TRN2 as shown in FIG. 2.

The multi-segment slope pattern circuit 20 may, according to the plurality of parameters related to the motor MT, determine a slope of the first curve segment SL11 and a slope of the second curve segment SL12 as shown in FIGS. 2 and 3. The multi-segment slope pattern circuit 20 may, according to the slope of the first curve segment SL11, determine an amplitude (such as 20%) of each of a plurality of waveforms of which values are connected to form the first curve segment SL11. The multi-segment slope pattern circuit 20 may, according to the slope of the second curve segment SL12, determine an amplitude (for example, falling within a range of 20% to 100%) of each of a plurality of waveforms of which values are connected to form the second curve segment SL2. The slope of the second curve segment SL12 is different from the slope of the first curve segment SL11. Finally, the multi-segment slope pattern circuit 20 may output a multi-segment slope pattern signal according to the slope of the first curve segment SL11 and the slope of the second curve segment SL12.

For example, the multi-segment slope pattern circuit 20 may determine the slope of the first curve segment SL11 according to the static friction that the motor MT being started up. After the motor driver of the embodiment of the present disclosure starts up the motor MT according to the first curve segment SL11 to overcome the static friction that the motor MT is subjected within the first motor startup time TRN1, the motor driver enters the second motor startup time TRN2 from the first motor startup time TRN1. The multi-segment slope pattern circuit 20 may determine the slope of the second curve segment SL12 according to the target rotational speed of the motor MT.

The slope of the curve segment of an earliest one of the plurality of motor startup times (such as the first curve segment SL11 for starting up the motor MT within the first motor startup time TRN1) divided from the motor startup time interval may be smaller than the slope of the curve segment of each later one of the plurality of motor startup times (such as the second curve segment SL12 for starting up the motor MT within the second motor startup time TRN2).

If necessary, the multi-segment slope pattern circuit 20 may store a plurality of startup slope patterns. Each of the plurality of startup slope patterns includes a plurality of sub-slope pattern segments. The motor driver of the embodiment of the present disclosure drives the motor MT according to the plurality of sub-slope pattern segments respectively within the plurality of motor startup times. The plurality of sub-slope pattern segments at least include a first sub-slope pattern segment and a second sub-slope pattern segment. In practice, the plurality of sub-slope pattern segments may include more than two sub-slope pattern segments.

The multi-segment slope pattern circuit 20 may select one of the plurality of startup slope patterns according to the plurality of parameters related to the motor MT. The multi-segment slope pattern circuit 20 may determine that a plurality of slopes respectively of a plurality of curve segments of the first startup waveform signal WS1 within the plurality of motor startup times are respectively equal to the plurality of slopes of the sub-slope pattern segments of the one of the plurality of startup slope patterns to output the multi-segment slope pattern signal.

For example, the slope of the first curve segment SL11 of the first startup waveform signal WS1 may be equal to the slope of the first sub-slope pattern segment, and the slope of the second curve segment SL12 of the first startup waveform signal WS1 may be equal to the slope of the second sub-slope pattern segment.

The startup signal generating circuit 30 may output the first startup waveform signal WS1 according to the multi-segment slope pattern signal from the multi-segment slope pattern circuit 20. Then, the motor controlling circuit 40 may output a motor controlling signal according to the first startup waveform signal WS1 from the startup signal generating circuit 30. Finally, the motor driving circuit 50 may output a motor starting signal to the motor MT to start up the motor MT according to the motor controlling signal from the motor controlling circuit 40.

Figure 4:
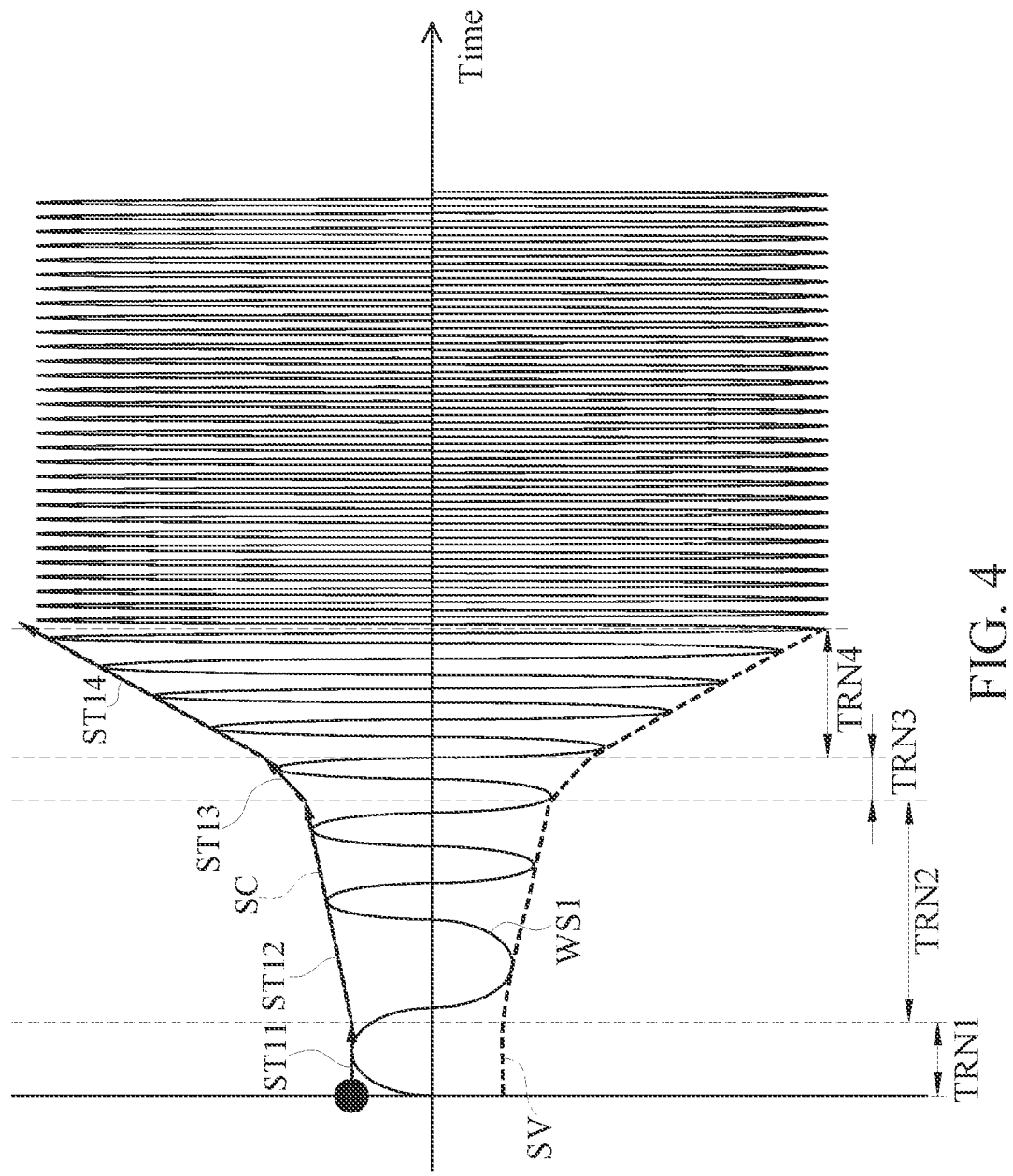
FIG. 4 is a waveform diagram of a signal of the motor driver having the high success rate starting mechanism according to the embodiment of the present disclosure.
Figure 5:
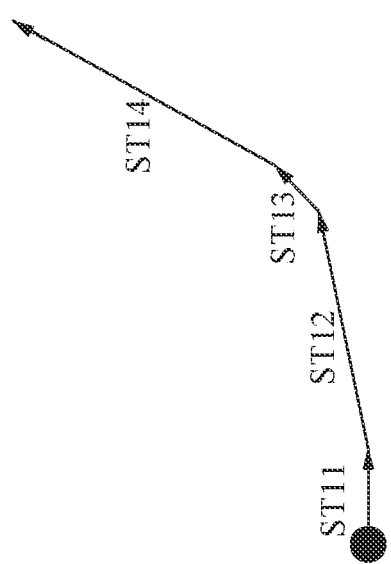
FIG. 5 is a schematic diagram of a plurality of slopes of a curve formed by connecting a plurality of peak values of waveforms of the signal of the motor driver having the high success rate starting mechanism according to the embodiment of the present disclosure.

Reference is made to FIGS. 1, 4 and 5, in which FIG. 1 is a block diagram of a motor driver having a high success rate starting mechanism according to an embodiment of the present disclosure, FIG. 4 is a waveform diagram of a signal of the motor driver having the high success rate starting mechanism according to the embodiment of the present disclosure, and FIG. 5 is a schematic diagram of a plurality of slopes of a curve formed by connecting a plurality of peak values of waveforms of the signal of the motor driver having the high success rate starting mechanism according to the embodiment of the present disclosure.

Each time the motor driver of the embodiment of the present disclosure drives the motor MT, the motor driver may adjust the number of and the slopes of the curve segments of the curve of the first startup waveform signal WS1. In the first startup waveform signal WS1, the values of the waveforms are connected to each other to form the curve. The curve segments of the curve are used to start up the motor MT respectively within the motor startup times. For example, the motor driver of the embodiment of the present disclosure initially outputs the first startup waveform signal WS1 as shown in FIG. 4 to start up the motor MT, and finally outputs the first startup waveform signal WS1 as shown in FIG. 2 to start up the motor MT.

For example, the multi-segment slope pattern circuit 20 as shown in FIG. 1 may divide the motor startup time interval into more motor startup times such as the first motor startup time TRN1, the second motor startup time TRN2, a third motor startup time TRN3 and a fourth motor startup time TRN4 as shown in FIG. 4, but the present disclosure is not limited thereto.

The multi-segment slope pattern circuit 20 may connect the peak values of the plurality of waveforms of the first startup waveform signal WS1 to each other to form a curve SC within the motor startup time interval as shown in FIG. 4. As shown in FIGS. 4 and 5, the curve SC includes a first curve segment ST11, a second curve segment ST12, a third curve segment ST13 and a fourth curve segment ST14 that are used to start up the motor MT respectively within the first motor startup time TRN1, the second motor startup time TRN2, the third motor startup time TRN3 and the fourth motor startup time TRN4.

It is worth noting that, a slope of the first curve segment ST11, a slope of the second curve segment ST12, a slope of the third curve segment ST13 and a slope of the fourth curve segment ST14 are different from each other.

If necessary, the multi-segment slope pattern circuit 20 may connect valley values of the plurality of waveforms of the first startup waveform signal WS1 to each other to form a curve SV within the motor startup time interval as shown in FIG. 4. The curve SV may include a plurality of curve segments. The slope of each one of the plurality of curve segments of the curve SV is different from the slope of any other one of the plurality of curve segments of the curve SV. The multi-segment slope pattern circuit 20 may determine the plurality of slopes of the plurality of curve segments of the curve SV according to the plurality of parameters of the motor MT.

An initial waveform amplitude determining circuit 10 may, according to the static friction that the motor being started up is subjected, determine an amplitude such as 20% of the waveform (that may be a first one of the plurality of waveforms) of the first startup waveform signal WS1 that is used to start up the motor MT within the first motor startup time TRN1 to output an initial waveform amplitude signal. The multi-segment slope pattern circuit 20 may, according to the static friction that the motor being started up is subjected, determine the slope of the first curve segment ST11 for starting up the motor MT within the first motor startup time TRN1 to output the multi-segment slope pattern signal.

The multi-segment slope pattern circuit 20 may, according to the parameter such as the target rotational speed of the motor MT, determine the slope of the second curve segment ST12 for starting up the motor MT within the second motor startup time TRN2. The multi-segment slope pattern circuit 20 may, according to the slope of the second curve segment ST12, further determine amplitudes, for example, falling within a range of 20% to 25%, of the waveforms of the first startup waveform signal WS1 that are used to start up the motor MT within the second motor startup time TRN2 to output the multi-segment slope pattern signal.

The multi-segment slope pattern circuit 20 may, according to the parameter such as the target rotational speed of the motor MT, determine the slope of the third curve segment ST13 for starting up the motor MT within the third motor startup time TRN3. The multi-segment slope pattern circuit 20 may, according to the slope of the third curve segment ST13, further determine an amplitude, for example, falling within a range of 25% to 35%, of the waveform of the first startup waveform signal WS1 that is used to start up the motor MT within the third motor startup time TRN3 to output the multi-segment slope pattern signal.

The multi-segment slope pattern circuit 20 may, according to the parameter such as the target rotational speed of the motor MT, determine the slope of the fourth curve segment ST14 for starting up the motor MT within the fourth motor startup time TRN4. The multi-segment slope pattern circuit 20 may, according to the slope of the fourth curve segment ST4, further determine amplitudes, for example, falling within a range of 35% to 100%, of the waveforms of the first startup waveform signal WS1 that are used to start up the motor MT within the fourth motor startup time TRN4 to output the multi-segment slope pattern signal.

The startup signal generating circuit 30 may output the first startup waveform signal WS1 according to the initial waveform amplitude signal and the multi-segment slope pattern signal. The motor controlling circuit 40 may output the motor controlling signal according to the first startup waveform signal WS1. The motor driving circuit 50 may output the motor starting signal to the motor MT to start up the motor MT according to the motor controlling signal.

In detail, the first curve segment ST11 is used to start up the motor MT to overcome the static friction that the motor MT is subjected, within the first motor startup time TRN1. Then, the second curve segment ST12 is used to slowly start up the motor MT within the second motor startup time TRN2. Then, the third curve segment ST13 of which the slope is larger than the slope of the second curve segment ST12 is used to quickly start up the motor MT within the third motor startup time TRN3. Then, the fourth curve segment ST14 of which the slope is larger than the slope of the third curve segment ST13 is used to more quickly start up the motor MT within the fourth motor startup time TRN4. As a result, the rotational speed of the motor MT is gradually increased to reach the target rotational speed. Finally, the motor MT is driven to stably rotate at the target rotational speed.

Figure 6:
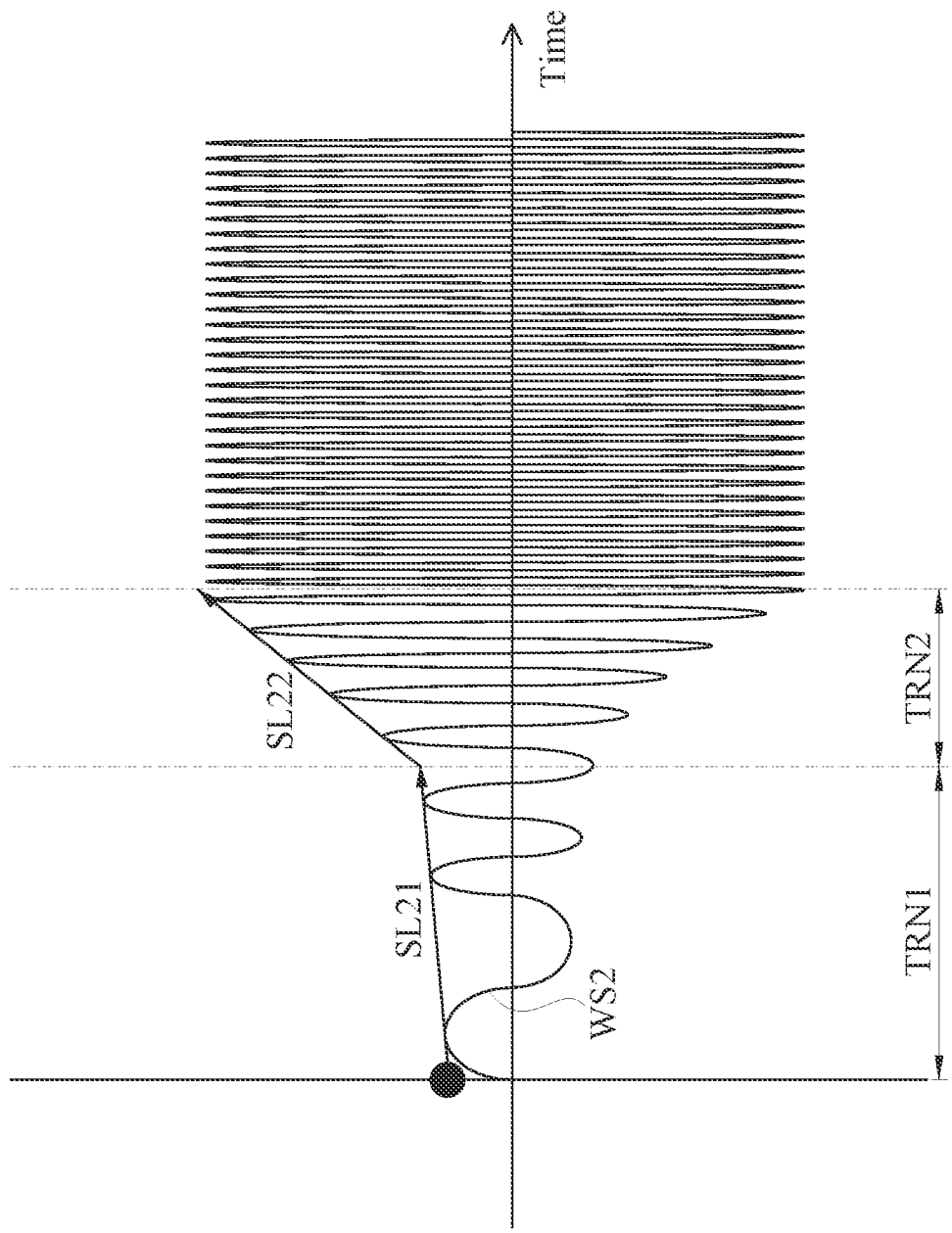
FIG. 6 is a waveform diagram of a signal of the motor driver having the high success rate starting mechanism according to the embodiment of the present disclosure.
Figure 7:
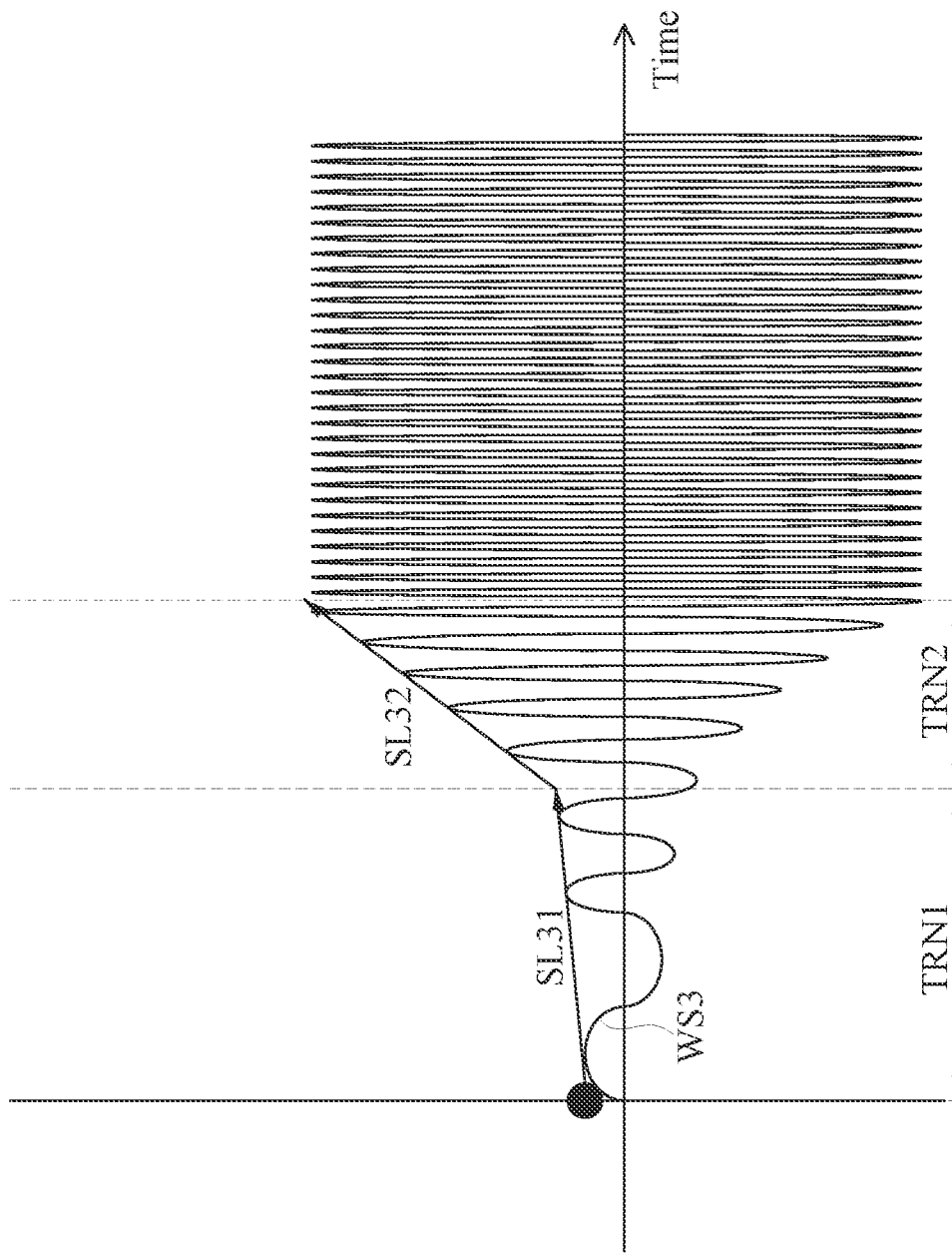
FIG. 7 is a waveform diagram of a signal of the motor driver having the high success rate starting mechanism according to the embodiment of the present disclosure.

Reference is made to FIGS. 1, 6 and 7, in which FIG. 6 is a waveform diagram of a signal of the motor driver having the high success rate starting mechanism according to the embodiment of the present disclosure, and FIG. 7 is a waveform diagram of a signal of the motor driver having the high success rate starting mechanism according to the embodiment of the present disclosure.

The motor driver of the embodiment of the present disclosure may include the initial waveform amplitude determining circuit 10 as shown in FIG. 1. As shown in FIG. 1, the initial waveform amplitude determining circuit 10 may be connected to the startup signal generating circuit 30.

The initial waveform amplitude determining circuit 10 may determine the amplitude of a first one (and others) of a plurality of waveforms of a first startup waveform signal that is used to initially start up the motor MT, according to the static friction that the motor NT being started up is subjected.

The larger the static friction is subjected by the motor NT being started up, the larger the amplitude (of the first one) of the waveforms of the first startup waveform signal, such as a first startup waveform signal WS2 as shown in FIG. 6, is determined by the initial waveform amplitude determining circuit 10 and is outputted by the startup signal generating circuit 30.

Conversely, the smaller the static friction is subjected by the motor NT being started up, the smaller the amplitude (of the first one) of the waveforms of the first startup waveform signal, such as a first startup waveform signal WS3 as shown in FIG. 7, is determined by the initial waveform amplitude determining circuit 10 and is outputted by the startup signal generating circuit 30.

If necessary, the initial waveform amplitude determining circuit 10 may store a plurality of first reference amplitudes and a plurality of second reference amplitudes. The plurality of first reference amplitudes are respectively larger than the plurality of second reference amplitudes.

When one of the plurality of parameters related to the motor MT indicates that the static friction that the motor MT being started up is subjected is larger than a static friction threshold, the initial waveform amplitude determining circuit 10 determines that the amplitudes of the waveforms of the first startup waveform signal WS2 are respectively equal to the first reference amplitudes.

Conversely, when the one of the plurality of parameters related to the motor MT indicates that the static friction that the motor MT being started up is subjected is not larger than the static friction threshold, the initial waveform amplitude determining circuit 10 determines that the amplitudes of the waveforms of the first startup waveform signal WS3 are respectively equal to the second reference amplitudes.

Figure 8:
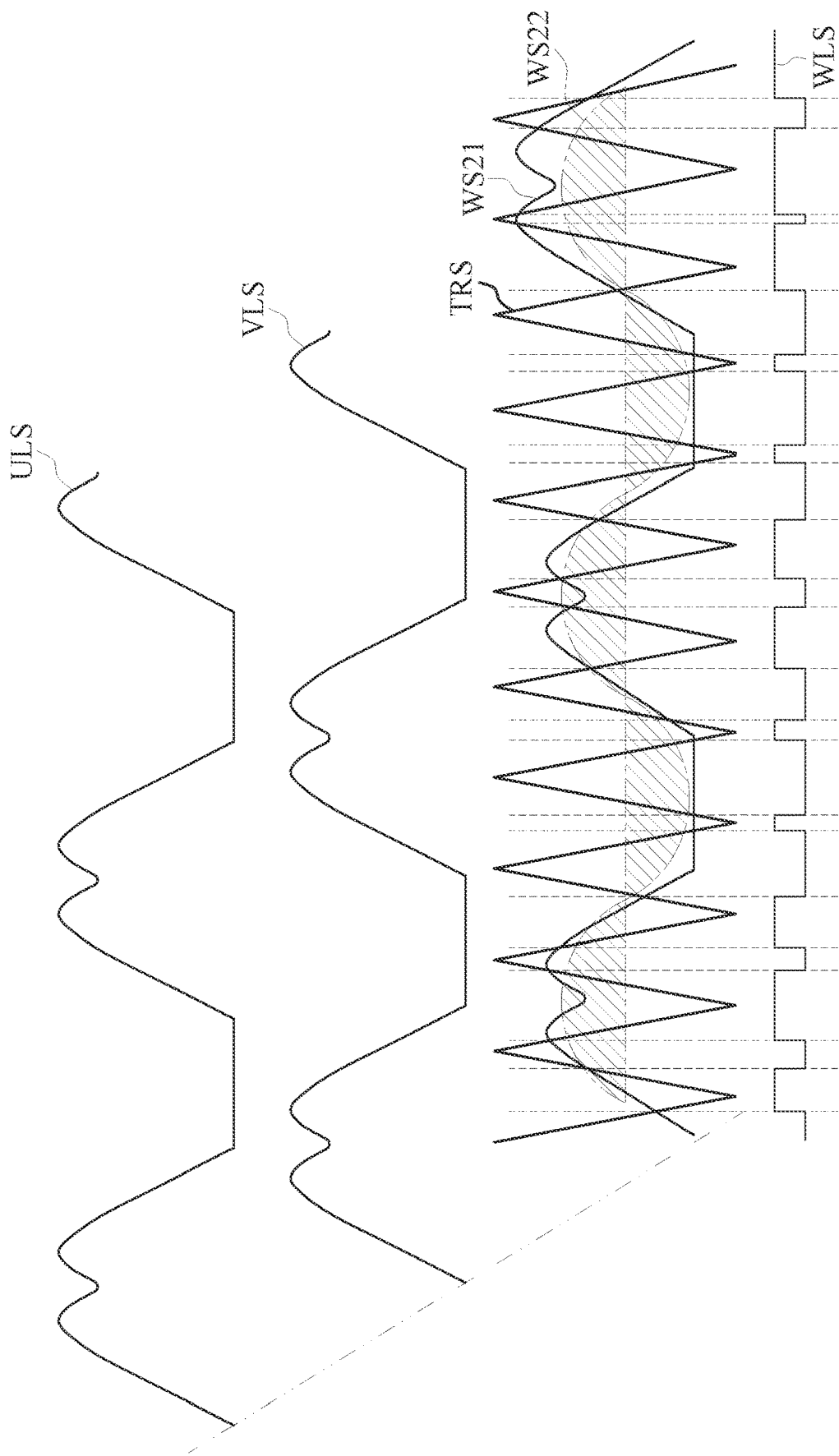
FIG. 8 is a waveform diagram of signals of the motor driver having the high success rate starting mechanism according to the embodiment of the present disclosure.

Reference is made to FIGS. 1 and 8, in which FIG. 1 is a block diagram of a motor driver having a high success rate starting mechanism according to an embodiment of the present disclosure, and FIG. 8 is a waveform diagram of signals of the motor driver having the high success rate starting mechanism according to the embodiment of the present disclosure.

The startup signal generating circuit 30 as shown in FIG. 1 may generate the first startup waveform signal such as the first startup waveform signal WS1 having the plurality of sinusoidal waveforms as shown in FIGS. 2 and 4, a first startup waveform signal WS22 having a plurality of sinusoidal waveforms as shown in FIG. 8, or a first startup waveform signal WS21 having a plurality of third harmonic waveforms as shown in FIG. 8.

In addition, the startup signal generating circuit 30 as shown in FIG. 1 may generate a second startup waveform signal such as a second startup waveform signal TRS having a plurality of triangular waveforms as shown in FIG. 8. In practice, the second startup waveform signal TRS may have sawtooth waveforms or other waveforms.

The motor controlling circuit 40 may output motor controlling signal WLS, ULS, VLS to (control terminals of a plurality of switch components of a bridge circuit included in) the motor driving circuit 50, according to the first startup waveform signal (and the second startup waveform signal). The motor driving circuit 50 starts up the motor MT according to the motor controlling signal WLS, ULS, VLS. On-times of the switch components depend on duty cycles of the motor controlling signal WLS, ULS, VLS.

In detail, the motor controlling circuit 40 may compare values of the first startup waveform signal with values of the second startup waveform signal to determine levels of the motor controlling signal WLS so as to determine the duty cycles of waveforms of the motor controlling signal WLS.

For example, as shown in FIG. 8, when the value of the first startup waveform signal WS21 is larger than the value of the second startup waveform signal TRS, the motor controlling circuit 40 determines that the level of the motor controlling signal WLS is at a high level. Conversely, when the value of the first startup waveform signal WS21 is smaller than the value of the second startup waveform signal TRS, the motor controlling circuit 40 determines that the level of the motor controlling signal WLS is at a low level.

In conclusion, the present disclosure provides the motor driver having a high success rate starting mechanism. The motor driver of the present disclosure is applicable to start up the motors that have different characteristics (such as different values of static friction that the motors of fans are respectively subjected) at a high success rate.

The motor driver of the present disclosure increases the amplitudes of the waveforms of the first startup waveform signal for starting up the motor to provide a higher driving force to the motor of the fan in a short period of time, such that the rotational speed of the motor is quickly increased to reach the target rotational speed required for a customer.

The motor driver of the present disclosure connects the peak values of the waveforms of the first startup waveform signal to each other to form the curve having the plurality of slopes. The motor driver of the present disclosure determines one of the plurality of slopes according to the static friction that the motor of the fan being started up is subjected. The motor driver of the present disclosure determines another of the plurality of slopes according to the target rotational speed of the motor. The motor driver of the present disclosure outputs the first startup waveform signal to start up the motor. As a result, the motor driver of the present disclosure provides the most suitable driving force to start up the motor for the characteristics of the motor such that the fan only generates low vibration noise.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver having a high success rate starting mechanism, which is applicable to start up a motor to rotate within a motor startup time interval, the motor driver comprising:
   a multi-segment slope pattern circuit configured to divide the motor startup time interval into a plurality of motor startup times according to a plurality of parameters related to the motor, configured to connect a plurality of values of a plurality of waveforms to each other to form a curve including a plurality of curve segments, and configured to determine a plurality of slopes respectively of the plurality of curve segments to output a multi-segment slope pattern signal according to the plurality of parameters related to the motor, wherein the plurality of curve segments are used to start up the motor respectively within the plurality of motor startup times, and the slope of the curve segment for starting the motor within each one of the plurality of motor startup times is different from that within any other one of the plurality of motor startup times;
   a startup signal generating circuit connected to the multi-segment slope pattern circuit, and configured to output a first startup waveform signal according to the multi-segment slope pattern signal;
   a motor controlling circuit connected to the startup signal generating circuit, and configured to output a motor controlling signal according to the first startup waveform signal; and
   a motor driving circuit connected to the motor controlling circuit and the motor, and configured to output a motor starting signal to the motor to start up the motor according to the motor controlling signal.

2. The motor driver according to claim 1, wherein the multi-segment slope pattern circuit divides the motor startup time interval into a first motor startup time and a second motor startup time that are included in the plurality of motor startup times.

3. The motor driver according to claim 1, wherein the multi-segment slope pattern circuit divides the motor startup time interval into a first motor startup time, a second motor startup time, a third motor startup time and a fourth motor startup time that are included in the plurality of motor startup times.

4. The motor driver according to claim 1, wherein the multi-segment slope pattern circuit connects a plurality of peak values respectively of the plurality of waveforms of the first startup waveform signal to each other to form the curve.

5. The motor driver according to claim 1, wherein the multi-segment slope pattern circuit connects a plurality of valley values respectively of the plurality of waveforms of the first startup waveform signal to each other to form the curve.

6. The motor driver according to claim 1, wherein the slope of the curve segment for starting up the motor within an earliest one of the plurality of motor startup times is smaller than the slope of the curve segment for starting up the motor within each later one of the plurality of motor startup times.

7. The motor driver according to claim 1, wherein the multi-segment slope pattern circuit, according to the plurality of parameters related to the motor, determines a number of the plurality of motor startup times divided from the motor startup time interval and a time length of each of the plurality of motor startup times.

8. The motor driver according to claim 1, wherein the plurality of parameters include a size of the motor, a weight of the motor, static friction that the motor being started up is subjected to, a target rotational speed of the motor, or any combination thereof.

9. The motor driver according to claim 1, wherein the multi-segment slope pattern circuit stores a plurality of startup slope patterns, each of the plurality of startup slope patterns includes a plurality of sub-slope pattern segments, the multi-segment slope pattern circuit selects one of the plurality of startup slope patterns according to the plurality of parameters related to the motor, and the multi-segment slope pattern circuit determines that the plurality of slopes of the plurality of curve segments within the plurality of motor startup times are respectively equal to a plurality of slopes of the plurality of sub-slope pattern segments of the one of the plurality of startup slope patterns.

10. The motor driver according to claim 1, further comprising:
    an initial waveform amplitude determining circuit connected to the startup signal generating circuit, and configured to determine amplitudes of one or more of the plurality of waveforms of the first startup waveform signal for initially starting up the motor to output an initial waveform amplitude signal, according to the plurality of parameters related to the motor;
    wherein the startup signal generating circuit outputs the first startup waveform signal, according to the initial waveform amplitude signal and the multi-segment slope pattern signal.

11. The motor driver according to claim 10, wherein the plurality of parameters related to the motors include static friction that the motor being started up is subjected to, and the amplitudes of one or more of the plurality of waveforms of the first startup waveform signal is increased by the initial waveform amplitude determining circuit as the static friction that the motor being started up is subjected to increases.

12. The motor driver according to claim 1, wherein the plurality of waveforms of the first startup waveform signal include a plurality of sinusoidal waveforms, a plurality of third harmonic waveforms, or a combination thereof.

13. The motor driver according to claim 1, wherein the motor controlling circuit compares a plurality of values of the first startup waveform signal with a plurality of values of a second startup waveform signal to determine levels of the motor controlling signal so as to determine duty cycles of a plurality of waveforms of the motor controlling signal.

14. The motor driver according to claim 13, wherein a plurality of waveforms of the second startup waveform signal include a plurality of triangle waveforms, a plurality of sawtooth waveforms, or a combination thereof.

* * * * *